(12) United States Patent
Morikawa

(10) Patent No.: US 6,510,118 B1
(45) Date of Patent: Jan. 21, 2003

(54) COPY RESTRICTION METHOD AND APPARATUS WHICH RESTRICT COPYING OF DATA FROM OPTICAL RECORDING MEDIUM TO ANOTHER RECORDING MEDIUM AND COPY-RESTRICTED OPTICAL RECORDING MEDIUM

(75) Inventor: Tomoyuki Morikawa, Nagoya (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/327,409

(22) Filed: Jun. 7, 1999

(30) Foreign Application Priority Data

Jun. 12, 1998 (JP) .............................. 10-164705

(51) Int. Cl.[7] .............................. G11B 7/28
(52) U.S. Cl. ....................... 369/84; 369/53.21
(58) Field of Search ............ 369/52.1, 53.21, 369/77.2, 84, 286, 273, 272; 380/203, 270; 705/57, 59, 51, 55, 58; 360/60; 283/81, 72

(56) References Cited

U.S. PATENT DOCUMENTS

| | | | | |
|---|---|---|---|---|
| 4,677,604 A | * | 6/1987 | Selby et al. ............. 369/30.27 |
| 5,235,586 A | * | 8/1993 | Feamster et al. ........... 369/77.2 |
| 5,513,169 A | * | 4/1996 | Fite et al. .................. 369/52.1 |
| 5,731,792 A | * | 3/1998 | Sheridon .................... 345/107 |
| 5,732,979 A | * | 3/1998 | Finke et al. .................. 283/72 |
| 5,905,798 A | * | 5/1999 | Nerlikar et al. ............... 360/60 |

FOREIGN PATENT DOCUMENTS

| JP | 5205397 | 8/1993 |
|---|---|---|
| JP | 8106720 | 4/1996 |

* cited by examiner

*Primary Examiner*—Muhammad Edun
*Assistant Examiner*—Kim-Kwok Chu

(57) ABSTRACT

A copy restriction method which imposes a restriction on copying data from a data recording region of an optical recording medium to another medium. A member removable by a user is attached to the data recording region. The copying is performed by an apparatus including a storage unit which stores information indicating a position of a member attached to the data recording region. The copy restriction method includes: a detecting step for detecting a position of the member attached on the data recording region and outputting information indicating the detected position; a judging step for judging whether the information output in the detecting step and the information stored in the storage unit indicate the same position; an instructing step for instructing the user to detach the member from the data recording region when it is judged so in the judging step; a checking step for checking whether the member has been detached after the user is instructed to detach; and an executing step for executing copying of the data from the data recording region of the optical recording medium to the other medium only when it is confirmed in the checking step that the member has been detached.

32 Claims, 6 Drawing Sheets

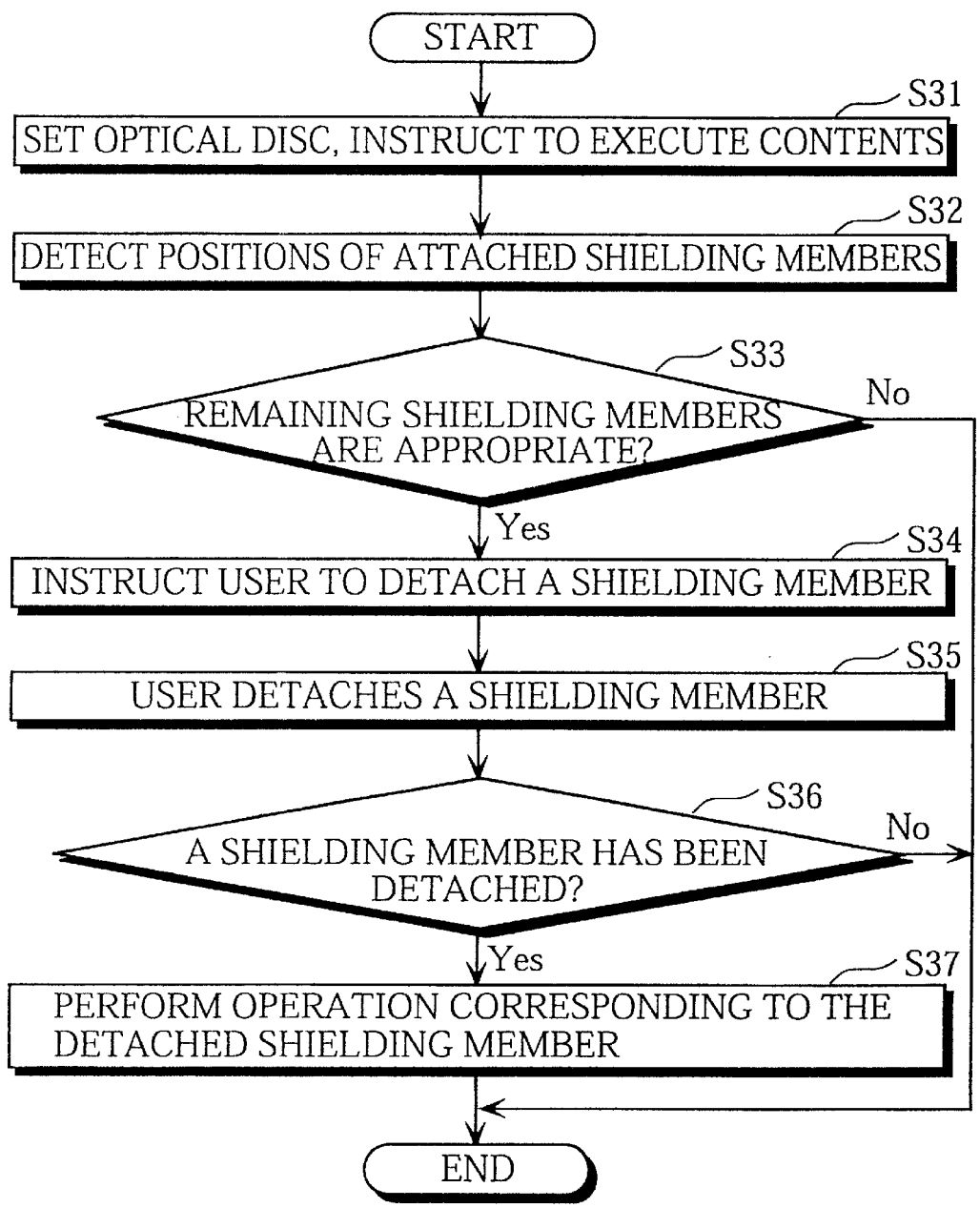

COPY RESTRICTION METHOD AND APPARATUS WHICH RESTRICT COPYING OF DATA FROM OPTICAL RECORDING MEDIUM TO ANOTHER RECORDING MEDIUM AND COPY-RESTRICTED OPTICAL RECORDING MEDIUM

This application is based on an application No. 10-164705 filed in Japan, the content of which is hereby incorporated by reference.

BACKGROUND OF THE INVENTION (1) Field of the Invention

This invention relates to a method and an apparatus for copying data from an optical recording medium to another recording medium, and relates to the optical recording medium, and specifically, relates to a technique for restricting the number of such copy operations and restricting objects to which data is copied.

(2) Description of the Prior Art

Recently, as personal computers have become widespread, optical recording media (hereinafter referred to as optical discs) have come into wide use as mass-storage recording media. In optical discs, data is recorded on their data recording region by using optical characteristics.

Since the data recorded on optical discs is digital data, the data copied from an optical disc to another medium maintains the same quality as the original.

Accordingly, the sales of optical discs storing original data will decrease if media storing an unauthorized copy of the original data penetrate the market. The sales of optical discs will similarly decrease if unauthorized copying of the original data spreads among users.

A variety of techniques have been proposed to prevent such unauthorized copying of the original data from optical discs.

One of such techniques is encryption in which an encryption key is set in advance so that the use of the target data is permitted only when the encryption key is used. However, unauthorized use or copy of the target data cannot be prevented with this technique when the encryption key itself is reused.

Another technique has been proposed in which the history of the use of an optical disc is recorded on the optical disc itself. It is possible with this technique to prohibit unauthorized copying by judging whether the disc stores the original data or copied data by referring to the history, or prevent unauthorized installment of the disc by judging whether the disc has once been installed. However, these functions are only available for rewritable optical discs, not for read-only optical discs which are less expensive than rewritable optical discs.

Japanese Laid-Open Patent Application No. 8-106720 entitled "METHOD FOR PROHIBITING COPY OF RECORDING MEDIUM AND REPRODUCTION APPARATUS" discloses a technique for preventing read-only optical discs from being copied. This technique utilizes a characteristic that data cannot be deleted from read-only optical discs storing original data and that data can be deleted from rewritable optical discs storing copies of the original data. According to the technique a program for executing the target data deletes the copied data only when a rewritable optical disc storing the data is loaded.

However, it is desired that this technical field is further improved since the above-introduced technique cannot be applied to all types of media to prevent unauthorized use or copy of data.

SUMMARY OF THE INVENTION

It is therefore an object of the present invention to provide a copy restriction method and apparatus which can impose a restriction on copying of data from an optical disc to another medium, and also to provide an optical disc whose data is imposed a restriction in terms of copying.

(A) The above object is fulfilled by a copy restriction method for imposing a restriction on copying data from a data recording region of an optical recording medium to another medium, where a member removable by a user is attached to the data recording region of the optical recording medium, and the copying is performed by an apparatus which comprises a storage unit which stores information indicating a position where the member should be attached on the data recording region, the copy restriction method comprising: a detecting step for detecting a position where the member is attached to the data recording region and outputting information indicating the detected position; a judging step for judging whether the information output in the detecting step and the information stored in the storage unit indicate a same position; an instructing step for instructing the user to detach the member from the data recording region when it is judged in the judging step that the information output in the detecting step and the information stored in the storage unit indicate the same position; a checking step for checking whether the member is detached after the user is instructed to detach in the instructing step; and an executing step for executing copying of the data from the data recording region of the optical recording medium to the other medium only when it is confirmed in the checking step that the member is detached.

With the above-stated construction, the user removes the member from the optical recording medium when the data is copied from the optical recording medium to another medium. Once this happens, the data on the optical recording medium is prevented from being copied. This enables the present method to impose a restriction on copying data from an optical recording medium to another recording medium.

(B) The above object is also fulfilled by a copy restriction method for imposing a restriction on copying data from a data recording region of an optical recording medium to another medium, where one or more members removable by a user are attached to different positions on the data recording region of the optical recording medium, and the copying is performed by an apparatus which comprises a storage unit which stores information indicating a plurality of positions where members should be attached on the data recording region, the copy restriction method comprising: a detecting step for detecting one or more positions where the one or more members are attached to the data recording region and outputting information indicating the detected one or more positions; a judging step for judging whether the one or more positions indicated by the information output in the detecting step are included in the plurality of positions indicated by the information stored in the storage unit; an instructing step for instructing the user to detach one out of the one or more members from the data recording region when it is judged in the judging step that the one or more positions indicated by the information output in the detecting step are included in the plurality of positions indicated by the information stored in the storage unit; a checking step for checking whether the one out of the one or more members is detached after the user is instructed to detach in the instructing step; and an executing step for executing copying of the data from the data recording region of the optical recording medium to the other medium only when it is confirmed in the checking step that the member is detached.

With the above-stated construction, the user detaches one member from the optical recording medium each time data is copied from the optical recording medium to another recording medium. That is to say, it is possible to copy data as many times as the number of members. As a result, it is possible for this method to limit the number of times data is copied from an optical recording medium to another recording medium.

(C) In the above copy restriction method, the storage unit may further store information indicating operations which each correspond to one of the plurality of positions where members should be attached, and in the checking step, when it is confirmed that the member is detached, the member is identified, and in the executing step, an operation corresponding to the member identified in the detecting step is selected from the operations indicated by the information stored in the storage unit and the selected operation is executed only when the member is identified in the checking step.

With the above-stated construction, when one of the plurality of members is detached by the user, a corresponding operation is executed. As a result, a plurality of operations can be set.

(D) In the copy restriction method, the storage unit may further store information indicating operations which each correspond to a different state in which the one or more members are attached to the data recording region, and in the checking step, when it is confirmed that the one out of the one or more members is detached, a state in which remainder of the one or more members is attached is identified, and in the executing step, an operation corresponding to the state identified in the checking step is selected from the operations indicated by the information stored in the storage unit and the selected operation is executed only when the member is identified in the detecting step.

With the above-stated construction, when one of the plurality of members is detached by the user, an operation corresponding to the state of the remaining attached members is executed. As a result, a plurality of operations can be set.

(E) In the above copy restriction method, the member may disable reading of data covered by the member itself on the data recording region, and in the detecting step, the position where the member is attached to the data recording region is detected by detecting a position where data cannot be read, and in the checking step, whether the member is detached is checked by checking whether data at the position indicated by the information stored in the storage unit can be read.

With the above-stated construction, it is easy to detect the position at which the member is attached since the member disables reading of data covered by the member itself on the data recording region.

(F) In the above copy restriction method, the member may disable reading of data covered by the member itself on the data recording region, and predetermined data is recorded on the member, the storage unit stores the same data as the predetermined data recorded on the member, and in the detecting step, the position where the member is attached to the data recording region is detected by detecting a position where the predetermined data stored in the storage unit is read, and in the checking step, whether the member is detached is checked by checking whether data at the position indicated by the information stored in the storage unit is different from the same data as the predetermined data stored in the storage unit.

With the above-stated-construction, it is easy to detect the position at which the member is attached since the member disables reading of data covered by the member itself on the data recording region and predetermined data is recorded on the member.

(G) In the above copy restriction method, the optical recording medium may store the information indicating the position where the member should be attached on the data recording region, and the copy restriction method further comprises: a reading step for reading the information indicating the position from the optical recording medium and storing the read information into the storage unit, the reading step being executed before the judging step.

With the above-stated construction in which the optical recording medium stores the information indicating the position where the member should be attached on the data recording region and the information is read and stored in a storage unit, the information need not be prestored in a storage unit, and it is also possible for the member to be attached at a different position for each optical recording medium.

(H) In the above copy restriction method, in the judging step, it may be judged that the information output in the detecting step and the information stored in the storage unit indicate a same position when deviation of the position of the attached member from the position indicated by the information stored in the storage unit is in a range of $-50\,\mu m$ to $+50\,\mu m$ and it is judged that the information output in the detecting step and the information stored in the storage unit indicate different positions when the deviation is out of the range of $-50\,\mu m$ to $+50\,\mu m$.

With the above-stated construction in which it is judged that the information output in the detecting step and the information stored in the storage unit indicate different positions when the deviation is out of the range of $-50\mu m$ to $+50\,\mu m$, it is difficult for the user to attach a member to the same position satisfying the above condition once he/she detaches the member from the optical recording member.

(I) The above object is also fulfilled by a copy restriction apparatus for copying data from a data recording region of an optical recording medium to another medium, where a member removable by a user is attached to the data recording region of the optical recording medium, the copy restriction apparatus comprising: a storage unit for storing information indicating a position where the member should be attached on the data recording region; a detecting unit for detecting a position where the member is attached to the data recording region and outputting information indicating the detected position; a judging unit for judging whether the information output from the detecting unit and the information stored in the storage unit indicate a same position; an instructing unit for instructing the user to detach the member from the data recording region when the judging unit judges that the information output from the detecting unit and the information stored in the storage unit indicate the same position; a checking unit for checking whether the member is detached after the user is instructed to detach by the instructing unit; and an executing unit for executing copying of the data from the data recording region of the optical recording medium to the other medium only when the checking unit confirms that the member is detached.

With the above-stated construction, the same effect as (A) is achieved.

(J) The above object is also fulfilled by a copy restriction apparatus for copying data from a data recording region of an optical recording medium to another medium, where one or more members removable by a user are attached to different positions on the data recording region of the optical recording medium, the copy restriction apparatus comprising: a storage unit for storing information indicating a plurality of positions where members should be attached on the data recording region; a detecting unit for detecting one or more positions where the one or more members are attached to the data recording region and outputting information indicating the detected one or more positions; a judging unit for judging whether the one or more positions indicated by the information output from the detecting unit are included in the plurality of positions indicated by the information stored in the storage unit; an instructing unit for instructing the user to detach one out of the one or more members from the data recording region when it is judged by the judging unit that the one or more positions indicated by the information output from the detecting unit are included in the plurality of positions indicated by the information stored in the storage unit; a checking unit for checking whether the one out of the one or more members is detached after the user is instructed to detach by the instructing unit; and an executing unit for executing copying of the data from the data recording region of the optical recording medium to the other medium only when it is confirmed by the checking unit that the one out of the one or more members is detached.

With the above-stated construction, the same effect as (A) is achieved.

(K) The above object is also fulfilled by an optical recording medium on whose data recording region data is recorded by using optical characteristics, where a member removable by a user is attached to the data recording region of the optical recording medium, and the member disables reading of data covered by the member itself on the data recording region.

With the above-stated construction in which a member removable by a user is attached to the data recording region and the member disables reading of data covered by the member itself, the user is urged to detach the member from the optical recording medium when data is copied from the medium to another medium. This prevents the data from being copied after the member is detached. As a result, it is possible to impose a restriction on copying data from an optical recording medium to another recording medium.

(L) The above object is also fulfilled by an optical recording medium on whose data recording region data is recorded by using optical characteristics, where one or more members removable by a user are attached to different positions on the data recording region, and each of the one or more members disables reading of data covered by the member itself on the data recording region.

With the above-stated construction in which a plurality of members are attached to the data recording region of the optical recording region and disable reading of data covered by the members, the user is urged to detach one member from the optical recording medium when data is copied from the medium to another medium. This allows the user to copy data as many times as the number of members. Also, it is easy to detect the positions at which the members are attached since the members disable reading of data covered by the members themselves on the data recording region. As a result, it is possible to limit the number of times data is copied from an optical recording medium to another recording medium.

(M) In the above optical recording medium, predetermined data may be recorded on the member.

With the above-stated construction, it is easy to detect the position at which the member is attached since the member disables reading of data covered by the member itself on the data recording region and predetermined data is recorded on the member.

(N) The above optical recording medium may further store the information which indicates the position where the member should be attached on the data recording region.

With the above-stated construction in which the optical recording medium stores the information indicating the position where the member should be attached on the data recording region and the information is read and stored in a storage unit, the information need not be prestored in a storage unit, and it is also possible for the member to be attached at a different position for each optical recording medium. Also, it is possible to achieve a high accuracy in the attachment of the member using an apparatus with less accuracy if the position of the member is measured after it is attached and information indicating the measured position is recorded on the member.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 is a flowchart showing the basic algorithm by which an operation is selected in accordance with a detached shielding member.

DESCRIPTION OF THE PREFERRED EMBODIMENTS

<Embodiment 1>

Construction

The method and apparatus of the present embodiment allow data to be copied from an optical disc as follows. A shielding member is attached to a part of the data recording region of each optical disc in advance. The attached shielding member prevents the data recorded under the member itself from being read. It is possible for the user to remove the shielding member from the disc. When copying data from such an optical disc to another recording medium, the copying device under control of a dedicated program detects the position of the shielding member and matches the detected position with a predetermined position to check whether the shielding member is attached appropriately. The device then urges the user to detach the shielding member from the optical disc and checks whether the member has been detached. When having confirmed that the user has detached the shielding member, the device is allowed to copy the data from the optical disc to the other medium.

The present apparatus and method use a characteristic that once the shielding member is detached from the data recording region, it is difficult to reattach the member to the region at the same position. This is because the data is recorded on the grooves formed on the optical disc whose width is as short as several microns.

Figure 1:
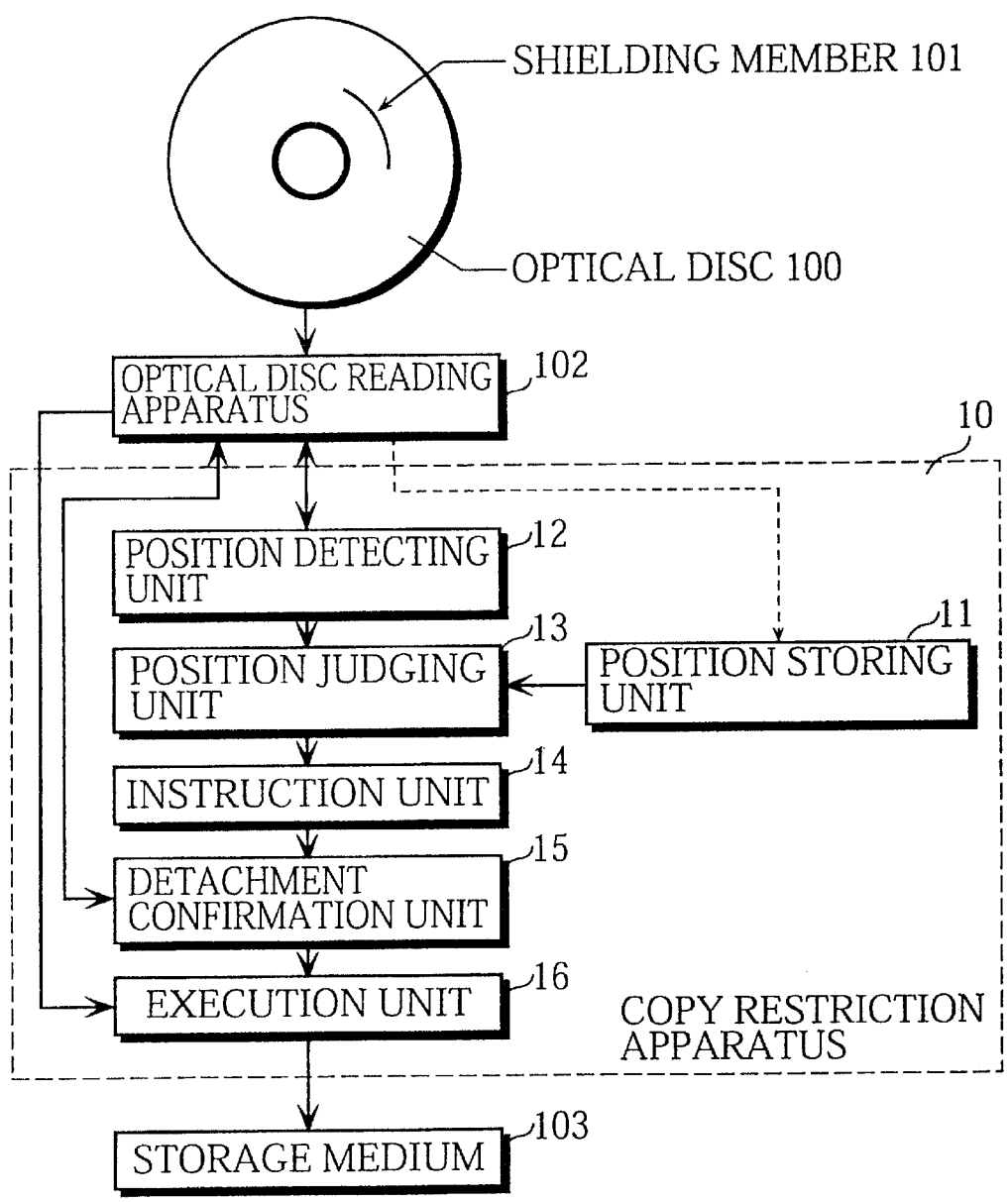
FIG. 1 is a block diagram showing the construction of a copy restriction apparatus 10 in Embodiment 1 of the present invention.

FIG. 1 is a block diagram showing the construction of a copy restriction apparatus 10 in Embodiment 1 of the present invention.

The copy restriction apparatus 10 includes a position storing unit 11, a position detecting unit 12, a position judging unit 13, an instruction unit 14, a detachment confirmation unit 15, and an execution unit 16.

FIG. 1 also shows an optical disc 100, a shielding member 101, an optical disc, reading apparatus 102, and a storage medium 103.

The optical disc 100 is an optical recording medium such as a DVD-ROM for recording data (e.g., contents of software applications) on its data recording region using optical characteristics. In the present embodiment, the optical disc 100 in its initial state has the shielding member 101 attached to the data recording region at a certain position.

The shielding member 101 is made of polyvinyl alcohol mixed with an iron oxide pigment, as will be described later in the explanation of the manufacturing method. The attached shielding member 101 partially shields the data recording region from a laser beam generated by the optical disc reading apparatus 102 and prevents the data from being read by the reading apparatus 102. It is easy for the user to detach the shielding member 101 from the optical disc, but is difficult to reattach it to the optical disc at the same position.

The optical disc reading apparatus 102 reads data recorded on the data recording region of the optical disc 100 by radiating the laser beam. Also, on receiving an instruction from the position detecting unit 12, the reading apparatus 102 detects the position on the data recording region at which the shielding member 101 is attached; on receiving an instruction from the detachment confirmation unit 15 the reading apparatus 102 checks whether the shielding member 101 is attached or not; on receiving an instruction from the execution unit 16, the reading apparatus 102 reads the data to be copied and sends the read data to the execution unit 16.

The position storing unit 11 prestores information indicating a predetermined position on the data recording region at which the shielding member 101 should be attached.

The position detecting unit 12 instructs the optical disc reading apparatus 102 to detect the position of the attached shielding member 101 by detecting a position on the data recording region where the reading apparatus 102 cannot read data. The position detecting unit 12 outputs information indicating the detected position.

The position judging unit 13 judges whether the information output from the position detecting unit 12 and the information stored in the position storing unit 11 indicate the same position.

The instruction unit 14 instructs the user to detach the shielding member 101 from the data recording region of the optical disc when position judging unit 13 judges that both pieces of information indicate the same position.

The detachment confirmation unit 15, after the instruction unit 14 instructs the user to detach the shielding member 101, instructs the optical disc reading apparatus 102 to check whether the shielding member 101 is attached or not by checking whether the reading apparatus 102 can read data from the position where the shielding member 101 should be attached.

The execution unit 16 copies data from the optical disc 100 to the storage medium 103 only when the detachment confirmation unit 15 have confirmed the detachment of the shielding member 101.

The storage medium 103 is a storage medium, different from the optical disc 100.

It is not desirable that the shielding member 101 is attached to a part where information specific to the optical disc is recorded. For example, when ordinary optical discs are loaded, data on the innermost part of the disc where information specific to the optical disc is recorded is first read. Therefore, it is desirable to attach the shielding member to an outermost part.

More specifically, it is not desirable to shield an area with physical address 00:02:16 since the area is defined to store a set of volume descriptors, according to the ISO9660 standard. Shielding the path table area should also be avoided since the directory information of the optical disc is recorded on the area.

It is desirable that the reflectance of the shielding member 101 is as low as possible. This is because the existence of a high-reflectance material may cause a reading apparatus to read data incorrectly. For example, a standard for CD-ROMs for a 780 nm laser beam defines that the reflectance of the data recording region is in the range of 65–70%. In reality, some CD-ROMs having a reflectance of 20% enable a reading apparatus to read data from them. Under such circumstances, it is desirable that the reflectance of the shielding member 101 is as low as 15% or less.

Operation

Figure 2:
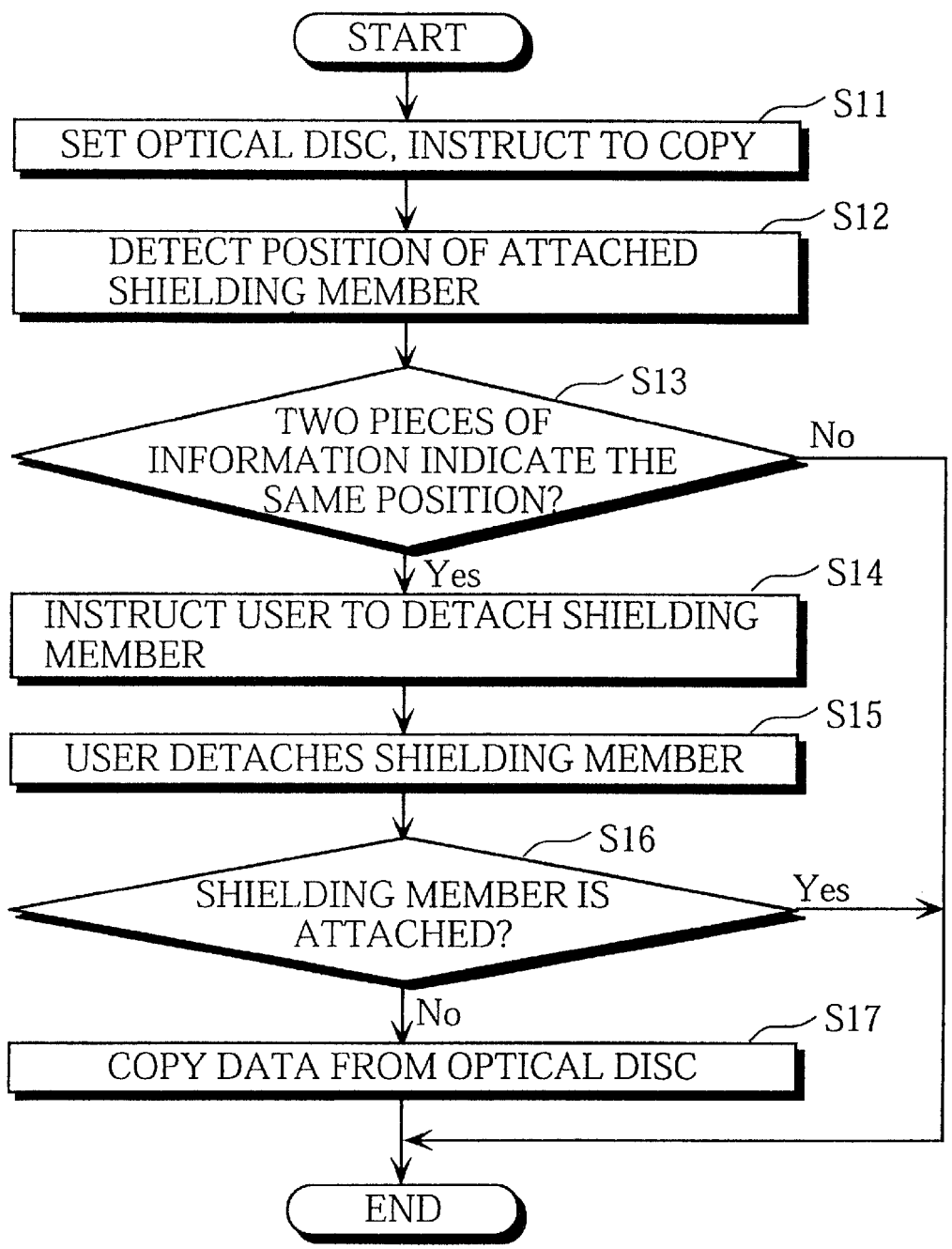
FIG. 2 is a flowchart showing the basic algorithm by which the copy restriction apparatus 10 restricts copying.

FIG. 2 is a flowchart showing the basic algorithm by which the copy restriction apparatus 10 restricts copying.

The copy restriction operation will be described with reference to FIG. 2.

(1) The user loads the optical disc 100 with the shielding member 101 on its surface into the optical disc reading apparatus 102, and instructs the copy restriction apparatus 10 to copy data from the optical disc 100 to the storage medium 103. (step S11)

(2) The position detecting unit 12 instructs the optical disc reading apparatus 102 to detect the position of the attached shielding member 101 by detecting the position where the reading apparatus 102 cannot read data, and outputs information indicating the detected position. (step S12)

(3) The position judging unit 13 judges whether the information output from the position detecting unit 12 and the information stored in the position storing unit 11 indicate the same position. When the position judging unit 13 judges that the two pieces of information do not indicate the same position or when the optical disc reading apparatus 102 fails to detect the position where it cannot read data, it is judged that copying is not available and the present process ends. (step S13)

(4) When the position judging unit 13 judges that the two pieces of information indicate the same position, the instruction unit 14 instructs the user to detach the shielding member 101 from the data recording region of the optical disc 100. (step S14)

(5) The user, on receiving the instruction from the instruction unit 14, takes out the optical disc from the optical disc reading apparatus 102, then detaches shielding member 101 from the data recording region of the optical disc 100, and reloads the optical disc into the optical disc reading apparatus 102. (step S15)

(6) The detachment confirmation unit 15 instructs the optical disc reading apparatus 102 to check whether the shielding member 101 is attached or not by checking whether the reading apparatus 102 can read data from the position where the shielding member 101 should be attached. When the detachment confirmation unit 15 confirms that the shielding member is attached, it is judged that copying is not available and the control goes to the end. (step S16)

(7) When the detachment confirmation unit 15 confirms the detachment of the shielding member, the execution unit 16 copies data from the optical disc 100 to the storage medium 103. (step S17)

After the execution unit executes copying once as described above, it is impossible for the user to copy the same data again since the user cannot attach the shielding member to the same position on the data recording region as that indicated by the information stored in the position storing unit 11. This prevents unrestrained copying.

Alternatively, certain data may be recorded on the surface of the shielding member 101 which prevents data under it from being read.

In this case, the position storing unit 11 prestores the same data as that written on the shielding member 101; the position detecting unit 12 instructs the optical disc reading apparatus 102 to detect the position where the shielding member 101 is attached by detecting a position where the reading apparatus 102 can read the same data as that stored in the position storing unit 11, and outputs information indicating the detected position where the shielding member 101 is attached; and the detachment confirmation unit 15 instructs the optical disc reading apparatus 102 to check whether the shielding member 101 is attached or not by checking whether the reading apparatus 102 reads the same data as that stored in the position storing unit 11 from the position where the shielding member 101 should be attached.

Method of Producing Optical Disc 100

The following describe the method of manufacturing optical discs to which the shielding member 101 is attached.

To attach the shielding member accurately to an optical disc at a specified position or area in the disc manufacturing process, a highly developed technique is required. This is because data is recorded in very small units on the optical discs.

Figure 3:
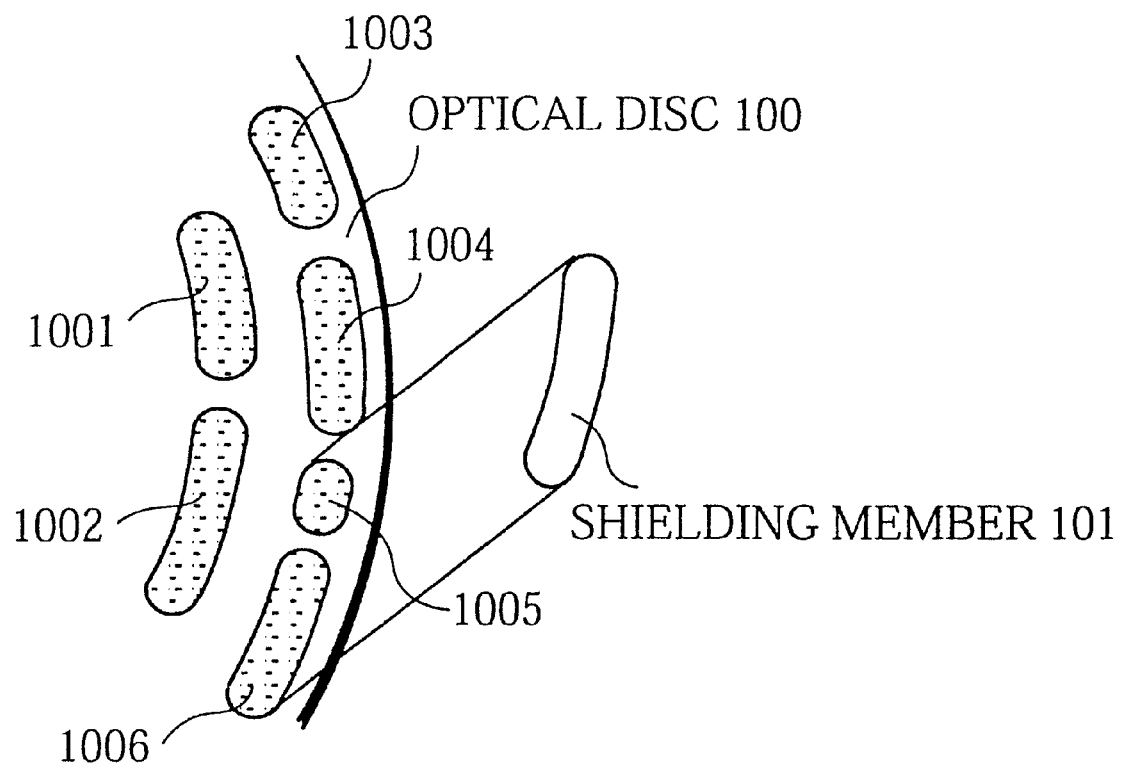
FIG. 3 shows the data recording region of the optical disc and a shielding member to be attached to the region.

FIG. 3 shows the data recording region of the optical disc and a shielding member to be attached to the region.

As shown in FIG. 3, there are patterns 1001 to 1006 on the data recording region of the optical disc 100. Data is recorded on these patterns. The shielding member 101 is stuck on these patterns at a certain position. A pattern, for example, is 0.5 $\mu$m in width (track width), 1.6 $\mu$m in pitch (track pitch), and 0.83 $\mu$m in minimum mark length.

First, optical discs without shielding member 101 are manufactured with a conventional method. Though various conventional methods are available, they are not described here.

Liquid made of polyvinyl alcohol mixed with a black iron oxide pigment (hereinafter, the liquid is referred to as a polyvinyl alcohol pigment) is applied to a certain area on the data recording region of the manufactured optical discs. The reason polyvinyl alcohol is selected as the material is that it has characteristics suitable for achieving the present invention, such as (1) it has a high oil resistance, (2) it has a high wear resistance, (3) it forms a thin layer when dried up, and (4) it spreads to a small extent when dried up. The reason a black iron oxide pigment is mixed is that it disables reading of data from the data recording region and that, as described earlier, it is desirable to use a material with low reflectance.

To improve the accurateness in applying the polyvinyl alcohol pigment to a certain area on the data recording region, 8 to 12 alignment marks are put on the optical disc surface at such positions as do not interfere reading of data. This is performed previously in the disc manufacturing process. An optical disc with the alignment marks is fixed on an X-Y stage which can slightly move. A position is determined based on these alignment marks, and the polyvinyl alcohol pigment is applied to the disc at the determined position.

The alignment marks are measured by, for example, a lightwave interferometer whose light source is an He—Ne laser beam having a wavelength of 530 nm or more. The measurement method has a high S/N ratio and is able to have accuracy in the range of 0.0006 $\mu$m to 0.02 $\mu$m.

The alignment marks are each a circle being 0.6 $\mu$m to 1.0 $\mu$m in diameter. Although it is possible to determine the position of the shielding member using three alignment marks at the minimum, 8 to 12 alignment marks are put on the surface. This is because as the number of marks is increased, each measurement error becomes close to the mean value of the measurement errors.

To achieve the present invention, the shielding member should be attached to the surface of the disc with such an accuracy as renders it difficult for the user to attach the member to the same position after detaching it once. Accordingly, it is desirable that the accuracy is in the range of "±(50 $\mu$m–| an error of another kind of accuracy |)" or higher. For example, suppose the error of another kind of accuracy is in the range of ±10 $\mu$m and the accuracy of the attachment of the shielding member is in the range of ±40 $\mu$m, then the position judging unit 13 judges that the two pieces of information indicate the same position when the deviation amount or the difference between the values indicated by the information output from the position detecting unit 12 and the information stored in the position storing unit 11 is in the range of ±50 $\mu$m; the position judging unit 13 judges as negative when the deviation amount exceeds the range of ±50 $\mu$m.

The shielding member can also be attached to the disc by applying a light cure resin mixed with a pigment more broadly than required, curing only a certain area of the applied resin by radiating a beam for the curing, and removing the rest of the resin that are not cured. It is known that a small spot with a diameter of 1 $\mu$m can be achieved easily using a laser beam and an object lens of a microscope. Therefore, in combination with a variety of techniques for reading optical discs, it is possible to attach the shielding member to each optical disc with an accuracy equivalent to the accuracy in reading data on the optical discs.

To indicate the position of the attached shielding member 101, a certain piece of information may be recorded on a certain area on the data recording region of the optical disc. In this case, the position storing unit 11, before anything else after the optical disc is loaded, instructs the reading apparatus 102 to read the information indicating the position, and stores the read information.

<Embodiment 2>

In Embodiment 1 in which the position storing unit 11 prestores information indicating a predetermined position on the data recording region at which the shielding member 101 should be attached, it is required that the shielding member is attached with a high accuracy. In such a case, errors in a certain range should also be considered. In Embodiment 2, therefore, the position or area where the shielding member 101 should be attached is not fixed, but the shielding member is attached to the data recording region with a certain degree of flexibility in terms of location.

In Embodiment 2, the shielding member is attached to the data recording region at an arbitrary place, then the position is measured and information indicating the measured position is stored in another recording area. The position may be measured in the same way as is measured by the position detecting unit 12 in Embodiment 1. The position storing unit 11 instructs the reading apparatus 102 to read the information indicating the position from the other recording area, and stores the read information.

The structure for prohibiting unrestrained copying is the same as Embodiment 1, and operations following the above operations are also the same as Embodiment 1.

Method of Producing Optical Disc 100

Figure 4:
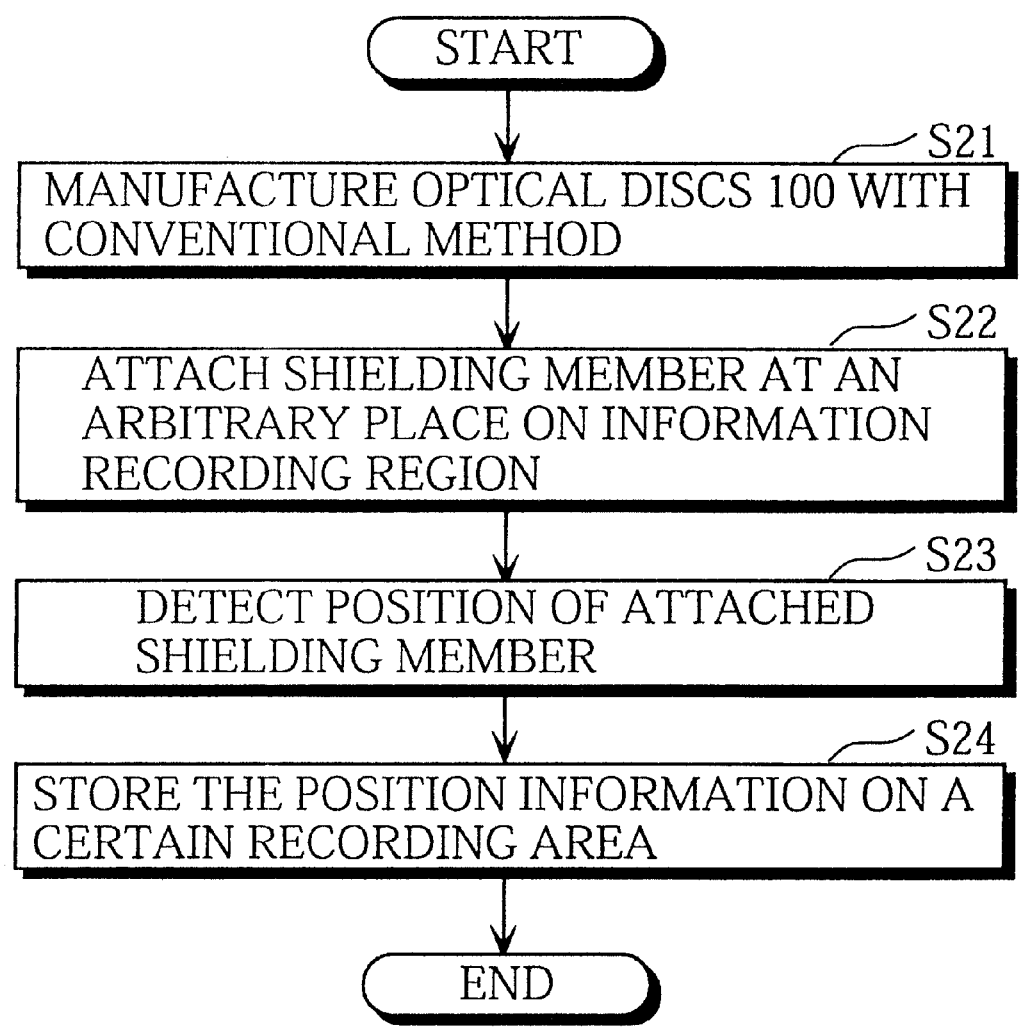
FIG. 4 is a flowchart showing the procedure of manufacturing the optical disc to which the shielding member is attached.

FIG. 4 is a flowchart showing the procedure of manufacturing the optical disc to which the shielding member is attached.

The optical disc manufacturing method will be described with reference to FIG. 4.

(1) Optical discs without shielding members are manufactured with a conventional method. (step S21)

(2) The shielding member 101 is attached to any place on the data recording region of the optical disc 100 in the same way as Embodiment 1. (step S22)

(3). A certain unit detects the position where the shielding member 101 is attached and outputs information indicating the detected position in the same way as the position detecting unit 12 of Embodiment 1 does. (step S23)

(4) The output information indicating the position is stored in a certain recording area on the data recording region of the optical disc 100. (step S24)

Here, the information indicating the position where the shielding member 101 is attached includes, for example, the start and end physical addresses of the position. In the discs conforming to the ISO9660 standard, the physical addresses are represented as "XX:YY:ZZ." As a result, the information may include character strings such as "XXYYZZ." However, in such a case, there is a high possibility that the user may find the position instantly from the physical addresses. Therefore, the information may be encrypted with, for example, the public-key cryptosystem to improve the security.

It is desirable that the information indicating the position of the attached shielding member 101 is recorded in an area in which data can be recorded during disc manufacturing process and whose data cannot be erased nor reprogrammed by general users. To further improve the security, it is also desirable that ordinary reading/writing methods for optical discs cannot be used for reading or writing data on the area. BCA (Burst Cutting Area) satisfies these conditions, for example.

The BCA, being defined as an area inherent to DVD-ROM, is located around the disc center hole with a radius of 22.3 mm (+0/−0.4). to 23.50 mm (±0.05). Data of 768 bytes (including a 4-byte error-correcting code) can be written onto the area by the YAG laser after the disc is pressed. The capacity is sufficient to store the information indicating the position of the attached shielding member 101.

<Embodiment 3>

In Embodiments 1 and 2, one shielding member is attached to each disc to restrict copying. In Embodiment 3, a plurality of shielding members are attached, allowing the same number of copy operations.

Figure 5:
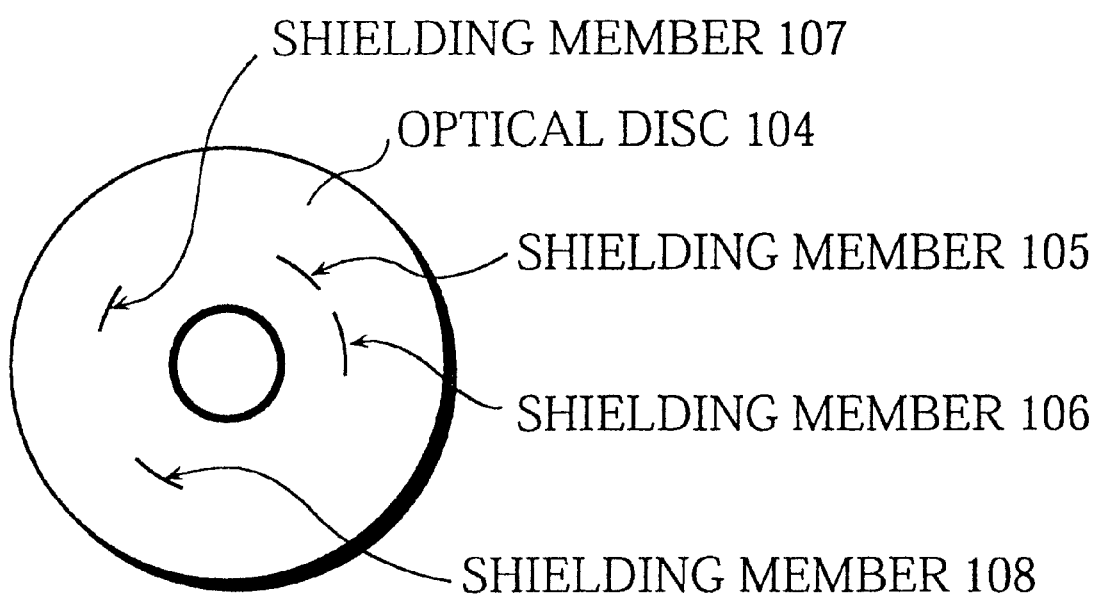
FIG. 5 shows the optical disc 104 to whose surface a plurality of shielding members are attached.

FIG. 5 shows the optical disc 104 to whose surface a plurality of shielding members are attached.

The optical disc 104 is the same as the optical disc 100 except that its data recording region is partially covered with a plurality of initially-attached shielding members 105 to 108.

Embodiment 3 is the same as the previous embodiments in terms of the region to which the shielding members are attached, or the conditions under which the shielding members are attached.

In Embodiment 3, the same operation for restricting the copy as described in the previous embodiments is repeated with the same construction.

A serial number indicating the order of detachment may be assigned to each of the plurality of shielding members. Alternatively, the user may detach any one of the shielding members per one copy operation.

The following arrangement is also available: a plurality of shielding members prevent a plurality of contents from being read; and an operation is selected and performed in correspondence to the detached shielding member. In this case, the position storing unit 11 further stores information indicating operations corresponding to the positions of the plurality of attached shielding members. When one shielding member is detached, the detachment confirmation unit 15 identifies the detached shielding member. The execution unit 16 selects an operation corresponding to the position of the detached shielding member by referring to the position storing unit 11 only when the detachment confirmation unit 15 identifies the detached shielding member, and executes the selected operation.

As another variation, the following arrangement is also available: a plurality of shielding members prevent a plurality of contents from being read; and an operation is selected and performed in correspondence to the state of remaining shielding members each time a member is detached. In this case, the position storing unit 11 further stores information indicating operations corresponding to the states of remaining shielding members. When one shielding member is detached, the detachment confirmation unit 15 checks the state of remaining shielding members. The execution unit 16 selects an operation corresponding to the checked state of remaining shielding members only when the detachment confirmation unit 15 confirms that one shielding member has been detached, and executes the selected operation.

FIG. 6 is a flowchart showing the basic algorithm by which an operation is selected in accordance with a detached shielding member.

This operation will be described with reference to FIG. 6.

It is presumed here that shielding members 107 and 108 have already been detached and shielding members 105 and 106 are remaining on the disc.

(1) The user loads the optical disc 100 to which the shielding members 105 and 106 are attached into the optical disc reading apparatus 102, and instructs the copy restriction apparatus 10 to execute the contents of the optical disc 104. (step S31)

(2) The position detecting unit 12 instructs the optical disc reading apparatus 102 to detect the positions of the attached shielding members by detecting the positions where the reading apparatus 102 cannot read data, and outputs a plurality of pieces of information indicating the detected positions. (step S32) In this example, the information indicates two positions where the shielding members 105 and 106 are attached, respectively.

(3) The position judging unit 13 identifies the remaining shielding members and judges whether the remaining shielding members are appropriate by comparing the information output from the position detecting unit 12 and the information stored in the position storing unit 11. It is judged that the instructed execution is not available and the present process ends when: (a) no shielding members remain, (b) no positions where the reading apparatus 102 cannot read data are detected, or (c) the information output from the position detecting unit 12 and the information stored in the position storing unit 11 do not match. (step S33) In this example, the position judging unit 13 judges that appropriate shielding members 105 and 106 remain.

(4) When the position judging unit 13 judges that the remaining shielding members are appropriate, the instruction unit 14 instructs the user to detach one of the shielding member 101 from the data recording region of the optical disc 104. (step S34) In this example, the instruction unit 14 instructs the user to detach either of shielding members 105 and 106.

(5) The user, on receiving the instruction from the instruction unit 14, takes out the optical disc 104 from the optical disc reading apparatus 102, then detaches either of shielding members 105 and 106 from the data recording region of the optical disc 100, and reloads the optical disc into the optical disc reading apparatus 102. (step S35) In this example, the user detaches shielding member 105.

(6) The detachment confirmation unit 15 judges whether one of the shielding members has been detached and, if any shielding member has been detached, identifies the detached shielding member. When none of them has been detached, it is judged that copying is not available and the present process ends. (step S36) In this example, the detachment confirmation unit 15 confirms the detachment of shielding member 105.

(7) The execution unit 16 performs an operation corresponding to the shielding member identified by the detachment confirmation unit 15. (step S37) In this example, the execution unit 16 performs an operation corresponding to the detachment of the shielding member 105.

In another method in which an operation is selected based on the state of remaining shielding members, almost all of the above steps can be used except that: in step S36, the detachment confirmation unit 15 identifies the state of remaining shielding members instead of identifying the detached shielding member; and in step S37, the execution unit 16 performs an operation corresponding to the state of remaining shielding members instead of performing an operation corresponding to the shielding member identified by the detachment confirmation unit 15. In the above example, the detachment confirmation unit 15 confirms that the shielding member 106 remains and the execution unit 16 performs an operation corresponding to the state that the shielding member 106 remains.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A copy restriction method for imposing a restriction on copying data from a data recording region of an optical recording medium to another medium, where a member removable by a user is attached to the data recording region of the optical recording medium, and the copying is performed by an apparatus which comprises a storage means which stores information indicating a position where the member should be attached on the data recording region, the copy restriction method comprising:

a detecting step for detecting a position where the member is attached to the data recording region and outputting information indicating the detected position;

a judging step for judging whether the information output in the detecting step and the information stored in the storage means indicate a same position;

an instructing step for instructing the user to detach the member from the data recording region when it is judged in the judging step that the information output in the detecting step and the information stored in the storage means indicate the same position;

a checking step for checking whether the member is detached after the user is instructed to detach in the instructing step; and an executing step for executing copying of the data from the data recording region of the optical recording medium to the other medium only when it is confirmed in the checking step that the member is detached.

2. The copy restriction method of claim 1, wherein the member disables reading of data covered by the member itself on the data recording region, and in the detecting step, the position where the member is attached to the data recording region is detected by detecting a position where data cannot be read, and in the checking step, whether the member is detached is checked by checking whether data at the position indicated by the information stored in the storage means can be read.

3. The copy restriction method of claim 2, wherein the optical recording medium stores the information indicating the position where the member should be attached on the data recording region, and the copy restriction method further comprises:

a reading step for reading the information indicating the position from the optical recording medium and storing the read information into the storage means, the reading step being executed before the judging step.

4. The copy restriction method of claim 1, wherein the member disables reading of data covered by the member itself on the data recording region, and predetermined data is recorded on the member, the storage means stores the same data as the predetermined data recorded on the member, and in the detecting step, the position where the member is attached to the data recording region is detected by detecting a position where the predetermined data stored in the storage means is read, and in the checking step, whether the member is detached is checked by checking whether data at the position indicated by the information stored in the storage means is different from the same data as the predetermined data stored in the storage means.

5. The copy restriction method of claim 4, wherein the optical recording medium stores the information indicating the position where the member should be attached on the data recording region, and the copy restriction method further comprises:

a reading step for reading the information indicating the position from the optical recording medium and storing the read information into the storage means, the reading step being executed before the judging step.

6. The copy restriction method of claim 1, wherein in the judging step, it is judged that the information output in the detecting step and the information stored in the storage means indicate a same position when deviation of the position of the attached member from the position indicated by the information stored in the storage means is in a range of $-50$ $\mu$m to $+50$ $\mu$m and it is judged that the information output in the detecting step and the information stored in the storage means indicate different positions when the deviation is out of the range of $-50$ $\mu$m to $+50$ $\mu$m.

7. A copy restriction method for imposing a restriction on copying data from a data recording region of an optical recording medium to another medium, wherein one or more members removable by a user are attached to different positions on the data recording region of the optical recording medium, and the copying is performed by an apparatus which comprises a storage means which stores information indicating a plurality of positions where members should be attached on the data recording region, the copy restriction method comprising:

- a detecting step for detecting one or more positions where the one or more members are attached to the data recording region and outputting information indicating the detected one or more positions;
- a judging step for judging whether the one or more positions indicated by the information output in the detecting step are included in the plurality of positions indicated by the information stored in the storage means;
- an instructing step for instructing the user to detach one out of the one or more members from the data recording region when it is judged in the judging step that the one or more positions indicated by the information output in the detecting step are included in the plurality of positions indicated by the information stored in the storage means;
- a checking step for checking whether the one out of the one or more members is detached after the user is instructed to detach in the instructing step; and
- an executing step for executing copying of the data from the data recording region of the optical recording medium to the other medium only when it is confirmed in the checking step that the member is detached.

8. The copy restriction method of claim 7, wherein the storage means further stores information indicating operations which each correspond to one of the plurality of positions where members should be attached, and in the checking step, when it is confirmed that the member is detached, the member is identified, and in the executing step, an operation corresponding to the member identified in the detecting step is selected from the operations indicated by the information stored in the storage means and the selected operation is executed only when the member is identified in the checking step.

9. The copy restriction method of claim 7, wherein the storage means further stores information indicating operations which each correspond to a different state in which the one or more members are attached to the data recording region, and in the checking step, when it is confirmed that the one out of the one or more members is detached, a state in which remainder of the one or more members is attached is identified, and in the executing step, an operation corresponding to the state identified in the checking step is selected from the operations indicated by the information stored in the storage means and the selected operation is executed only when the member is identified in the detecting step.

10. The copy restriction method of claim 7, wherein the member disables reading data covered by the member itself on the data recording region, and in the detecting step, the position where the member is attached to the data recording region is detected by detecting a position where data cannot be read, and in the checking step, whether the member is detached is checked by checking whether data at the position indicated by the information stored in the storage means can be read.

11. The copy restriction method of claim 10, wherein the optical recording medium stores the information indicating the position where the member should be attached on the data recording region, and the copy restriction method further comprises:

- a reading step for reading the information indicating the position from the optical recording medium and storing the read information into the storage means, the reading step being executed before the judging step.

12. The copy restriction method of claim 7, wherein the member disables reading of data covered by the member itself on the data recording region, and predetermined data is recorded on the member, the storage means stores the same data as the predetermined data recorded on the member, and in the detecting step, the position where the member is attached to the data recording region is detected by detecting a position where the predetermined data stored in the storage means is read, and in the checking step, whether the member is detached is checked by checking whether data at the position indicated by the information stored in the storage means is different from the same data as the predetermined data stored in the storage means.

13. The copy restriction method of claim 12, wherein the optical recording medium sores the information indicating the position where the member should be attached on the data recording region, and the copy restriction method further comprises:

- a reading step for reading the information indicating the position from the optical recording medium and storing the read information into the storage means, the reading step being executed before the judging step.

14. The copy restriction method of claim 7, wherein in the judging step, it is judged that the information output in the detecting step and the information stored in the storage means indicate a same position when deviation of the position of the attached member from the position indicated by the information stored in the storage means is in a range of −50 μm to +50 μm and it is judged that the information output in the detecting step and the information stored in the storage means indicate different positions when the deviation is out of the range of −50 μm to +50 μm.

15. A copy restriction apparatus for copying data from a data recording region of an optical recording medium to another medium, wherein a member removable by a user is attached to the data recording region of the optical recording medium, the copy restriction apparatus comprising:

- a storage means for storing information indicating a position where the member should be attached on the data recording region;
- a detecting means for detecting a position where the member is attached to the data recording region and outputting information indicating the detected position;
- a judging means for judging whether the information output from the detecting means and the information stored in the storage means indicate a same position;

an instructing means for instructing the user to detach the member from the data recording region when the judging means judges that the information output from the detecting means and the information stored in the storage means indicate the same position;

a checking means for checking whether the member is detached after the user is instructed to detach by the instructing means; and an executing means for executing copying of the data from the data recording region of the optical recording medium to the other medium only when the checking means confirms that the member is detached.

16. The copy restriction apparatus of claim 15, wherein the member disables reading of data covered by the member itself on the data recording region, and the detecting means detects the position where the member is attached to the data recording region by detecting a position where data cannot be read, and the checking means checks whether the member is detached by checking whether data at the position indicated by the information stored in the storage means can be read.

17. The copy restriction apparatus of claim 16, wherein the optical recording medium stores the information indicating the position where the member should be attached on the data recording region, and the copy restriction apparatus further comprises:
   a reading means for reading the information indicating the position from the optical recording medium and storing the read information into the storage means.

18. The copy restriction apparatus of claim 15, wherein the member disables reading of covered by the member itself on the data recording region, and predetermined data is recorded on the member, the storage means stores the same data as the predetermined data recorded on the member, and the detecting means detects the position where the member is attached to the data recording region by detecting a position where the predetermined data stored in the storage means is read, and the checking means checks whether the member is detached by checking whether data at the position indicated by the information stored in the storage means is different from the same data as the predetermined data stored in the storage means.

19. The copy restriction apparatus of claim 18, wherein the optical recording medium stores the information indicating the position where the member should be attached on the data recording region, and the copy restriction apparatus further comprises:
   a reading means for reading the information indicating the position from the optical recording medium and storing the read information into the storage means.

20. The copy restriction apparatus of claim 15, wherein the judging means judges that the information output from the detecting means and the information stored in the storage means indicate a same position when deviation of the position of the attached member from the position indicated by the information stored in the storage means is in a range of −50 μm to +50 μm and judges that the information output from the detecting means and the information stored in the storage means indicate different positions when the deviation is out of the range of −50 μm to +50 μm.

21. A copy restriction apparatus for copying data from a data recording region of an optical recording medium to another medium, wherein one or more members removable by a user are attached to different positions on the data recording region of the optical recording medium, the copy restriction apparatus comprising:

a storage means for storing information indicating a plurality of positions where members should be attached on the data recording region;

a detecting means for detecting one or more positions where the one or more members are attached to the data recording region and outputting information indicating the detected one or more positions;

a judging means for judging whether the one or more positions indicated by the information output from the detecting means are included in the plurality of positions indicated by the information stored in the storage means;

an instructing means for instructing the user to detach one out of the one or more members from the data recording region when it is judged by the judging means that the one or more positions indicated by the information output from the detecting means are included in the plurality of positions indicated by the information stored in the storage means;

a checking means for checking whether the one out of the one or more members is detached after the user is instructed to detach by the instructing means; and an executing means for executing copying of the data from the data recording region of the optical recording medium to the other medium only when it is confirmed by the checking means that the one out of the one or more members is detached.

22. The copy restriction apparatus of claim 21, wherein the storage means further stores information indicating operations which each correspond to one of the plurality of positions where members should be attached, and when it is confirmed by the checking means that the one out of the one or more members is detached, the detecting means identifies the detached member, and the executing means selects an operation corresponding to the member identified by the detecting means from the operations indicated by the information stored in the storage means and executes the selected operation only when the member is identified by the detecting means.

23. The copy restriction apparatus of claim 21, wherein the storage means further stores information indicating operations which each correspond to a different state in which the one or more members are attached to the data recording region, and when it is confirmed by the checking means that the one out of the one or more members is detached, the detecting means identifies a state in which remainder of the one or more members is attached, and the executing means selects an operation corresponding to the state identified by the detecting means from the operations indicated by the information stored in the storage means and executes the selected operation only when the detached member is identified by the detecting means.

24. The copy restriction apparatus of claim 21, wherein the member disables reading of data covered by the member itself on the data recording region, and the detecting means detects the position where the member is attached to the data recording region by detecting a position where data cannot be read, and the checking means checks whether the member is detached by checking whether data at the position indicated by the information stored in the storage means can be read.

25. The copy restriction apparatus of claim 24, wherein
the optical recording medium stores the information indicating the position where the member should be attached on the data recording region, and the copy restriction apparatus further comprises:
a reading means for reading the information indicating the position from the optical recording medium and storing the read information into the storage means.

26. The copy restriction apparatus of claim 21, wherein
the member disables reading of data covered by the member itself on the data recording region, and predetermined data is recorded on the member, the storage means stores the same data as the predetermined data recorded on the member, and the detecting means detects the position where the member is attached to the data recording region by detecting a position where the predetermined data stored in the storage means is read, and the checking means checks whether the member is detached by checking whether data at the position indicated by the information stored in the storage means is different from the same data as the predetermined data stored in the storage means.

27. The copy restriction apparatus of claim 26, wherein
the optical recording medium stores the information indicating the position where the member should be attached on the data recording region, and the copy restriction apparatus further comprises:
a reading means for reading the information indicating the position from the optical recording medium and storing the read information into the storage means.

28. The copy restriction apparatus of claim 21, wherein
the judging means judges that the information output from the detecting means and the information stored in the storage means indicate a same position when deviation of the position of the attached member from the position indicated by the information stored in the storage means is in a range of −50 μm to +50 μm and judges that the information output from the detecting means and the information stored in the storage means indicate different positions when the deviation is out of the range of −50 μm to +50 μm.

29. An optical recording medium with a data recording region where data is recorded by using an optical head, wherein a member, removable by a user, is attached to the data recording region of the optical recording medium, the member disables reading of data covered by the member itself on the data recording region, and information indicating a position where the member should be attached on the data recording region is recorded on the optical recording medium.

30. The optical recording medium of claim 29, wherein predetermined data is recorded on the member.

31. An optical recording medium with a data recording region where data is recorded by using an optical head, wherein a plurality of members, removable by a user, are attached to different positions on the data recording region, one or more of the plurality of members disables reading of data covered by the member itself on the data recording region; and information indicating positions where the plurality of members should be attached on the data recording region is recorded on the optical recording medium.

32. The optical recording medium of claim 31, wherein predetermined data is recorded on the member.

* * * * *